(12) United States Patent
Fujii (10) Patent No.: US 7,756,425 B2
(45) Date of Patent: Jul. 13, 2010

(54) ERROR NOTIFICATION DEVICE NOTIFYING OF OCCURRENCE OF ERROR

(75) Inventor: Masato Fujii, Nagaokakyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1250 days.

(21) Appl. No.: 11/297,468

(22) Filed: Dec. 9, 2005

(65) Prior Publication Data

US 2007/0047454 A1 Mar. 1, 2007

(30) Foreign Application Priority Data

Aug. 25, 2005 (JP) ............................. 2005-244580

(51) Int. Cl.
*G03G 15/00* (2006.01)
(52) U.S. Cl. ................... 399/9; 399/8; 399/16; 399/21; 399/23
(58) Field of Classification Search ............... 399/8–10, 399/16, 21, 23
See application file for complete search history.

(56) References Cited

U.S. PATENT DOCUMENTS

| | | | |
|---|---|---|---|
| 6,041,425 A | 3/2000 | Kokunishi et al. | |
| 6,437,882 B1 | 8/2002 | Kanematsu et al. | |
| 2005/0010608 A1 | 1/2005 | Horikawa | |

FOREIGN PATENT DOCUMENTS

| | | | |
|---|---|---|---|
| JP | 8-223396 | | 8/1996 |
| JP | 10-078894 | | 3/1998 |
| JP | 10-149064 | | 6/1998 |
| JP | 11-34441 | | 2/1999 |
| JP | 11034441 | A * | 2/1999 |
| JP | 11-119604 | | 4/1999 |
| JP | 2000-222248 | | 8/2000 |
| JP | 2002-236576 | | 8/2002 |
| JP | 2003-108355 | | 4/2003 |
| JP | 2004-342015 | | 12/2004 |
| JP | 2005-001128 | | 1/2005 |
| JP | 2005-031771 | | 2/2005 |
| JP | 2005-045551 | | 2/2005 |

* cited by examiner

*Primary Examiner*—David M Gray
*Assistant Examiner*—Joseph S Wong
(74) *Attorney, Agent, or Firm*—Buchanan Ingersoll & Rooney PC (57) ABSTRACT

When an error occurs in an image processor, error information including a performer of the job having been processed upon occurrence of the error, the type of the job, and the type of the error is transmitted to a host. In the host, a transmission destination of support information is determined based on the type of the job having been processed upon the occurrence of the error, and the support information is retrieved from a knowledge base, based on the type of the error in the job, and transmitted to the transmission destination.

20 Claims, 9 Drawing Sheets

| TYPE OF JOB | TRANSMISSION DESTINATION |
|---|---|
| COPY | DEVICE PANEL |
| PC PRINT | USER TERMINAL |
| BOX PRINT | DEVICE PANEL |
| SECURE PRINT (PC to secure BOX) (secure BOX print) | USER TERMINAL, DEVICE PANEL |
| CONFIRM PRINT (PC to temp BOX) (temp BOX print) | USER TERMINAL, DEVICE PANEL |
| PC to my BOX | USER TERMINAL |
| PC to other BOX | USER TERMINAL |
| Scan to my BOX | DEVICE PANEL |
| Scan to other BOX | DEVICE PANEL |
| Scan to E-mail | DEVICE PANEL |
| Scan to FAX | DEVICE PANEL |
| BOX to FAX | DEVICE PANEL |
| PC to FAX | USER TERMINAL |
| BOX to other BOX | DEVICE PANEL |
| FAX to BOX | DEVICE PANEL |
| FAX to print | DEVICE PANEL |
| FAX to PC | DEVICE PANEL |

FIG.6B

| ERROR | CONTENT OF PANEL DISPLAY |
|---|---|
| WASTE TONER TANK FULL | WASTE TONER TANK IS FULL. OPEN THE COVER, AND CHANGE THE WASTE TONER TANK ON THE LOWER RIGHT. |
| JAM AT TRAY 1 | ....... |
| ....... | ....... |

FIG.6C

| ERROR | CONTENT OF PC DISPLAY |
|---|---|
| LINE ERROR | LINE MAY BE DISCONNECTED. CHECK THE REAR FACE CONNECTOR PORTION. FOR MORE DETAILED INFORMATION, SEE THE FOLLOWING URL: http://....... |
| NO PAPER ON THE OTHER END | ....... |

FIG.8A  IMAGE PROCESSOR
FIG.8B  HOST
FIG.8C  KNOWLEDGE BASE

| TYPE OF JOB | TRANSMISSION DESTINATION | | | |
|---|---|---|---|---|
| | JOB PERFORMER | WORK-FLOW STARTER | PREVIOUS-JOB PERFORMER | NEXT-JOB PERFORMER |
| COPY | ○ | ○ | — | — |
| PC PRINT | ○ | ○ | — | — |
| BOX PRINT | ○ | ○ | — | — |
| SECURE PRINT | ○ | ○ | — | — |
| CONFIRM PRINT | ○ | ○ | — | — |
| PC to my BOX | ○ | ○ | — | ○ |
| PC to other BOX | ○ | ○ | — | — |
| Scan to my BOX | ○ | ○ | — | ○ |
| Scan to other BOX | ○ | ○ | — | ○ |
| Scan to E-mail | ○ | ○ | — | ○ |
| Scan to FAX | ○ | ○ | — | ○ |
| BOX to FAX | ○ | ○ | — | — |
| PC to FAX | ○ | ○ | — | — |
| BOX to other BOX | ○ | ○ | ○ | — |
| FAX to BOX | ○ | ○ | ○ | — |
| FAX to print | ○ | ○ | ○ | — |
| FAX to PC | ○ | ○ | — | ○ |
| BOX to PC | ○ | ○ | — | ○ |

FIG.11

ERROR NOTIFICATION DEVICE NOTIFYING OF OCCURRENCE OF ERROR

This application is based on Japanese Patent Application No. 2005-244580 filed with the Japan Patent Office on Aug. 25, 2005, the entire content of which is hereby incorporated by reference.

BACKGROUND OF THE INVENTION

1. Field of the Invention

The present invention relates to an error notification method, an error notification program product and an error notification device, and more particularly to an error notification method, an error notification program product and an error notification device capable of notifying an appropriate notification destination of occurrence of an error.

2. Description of the Related Art

There is a case where printers or other devices are shared in a network environment. When an error occurs in such a device, it is necessary to receive information (support information) for addressing the error and to actually handle the error by referring to the information.

When the device is used in the network environment, however, if an error occurs some time after start of operation, the location where the support information is received may not be the same as the location where the operator is present upon occurrence of the error. If the location where the error has occurred or where the error should be addressed is distant from the location where the support information is received, the user may feel very inconvenient.

As a way of solving such a problem, for example, Japanese Laid-Open Patent Publication No. 08-223396 discloses a management system of an image forming device where, when a copier management device receives fault data in the form of a routine communication report from a copying machine, it transmits the report to a host computer that is specified in accordance with information specifying the type of the fault and the received time.

Further, Japanese Laid-Open Patent Publication No. 2002-236576 discloses a technique where electronic equipment such as a digital composite machine diagnoses the state of itself and transmits the information showing the state to a transmission destination according to the diagnosis result.

Japanese Laid-Open Patent Publication No. 2005-001128 discloses a printer which transmits information of various contents/uses such as job information, consumables information and others, to a transmission destination according to the information Still further, Japanese Laid-Open Patent Publication No. 2005-045551 discloses an image processor where, when an error is left as it is or a printed matter or an original is left as it is, a user terminal having designated the processing or a pre-registered notification destination terminal is informed of the neglect.

In the methods disclosed in the above documents, however, the information about occurrence of an error, its time, or the information of consumables is transmitted to the destination according to the state of the equipment. It may not be transmitted accurately to the location of the user who should handle the error.

Further, in the case where an error occurs in a so-called work flow, which is a combination of jobs that are executed at prescribed timings, a person corresponding to the job should be notified of the error. The notification may not be transmitted to an appropriate destination with the methods disclosed in the above-described patent documents.

SUMMARY OF THE INVENTION

The present invention has been made to solve the above-described problems. An object of the present invention is to provide an error notification method, an error notification program product and an error notification device capable of providing support information to an appropriate destination upon occurrence of an error.

To achieve the object, according to an aspect of the present invention, an error notification method includes: the obtaining step of obtaining information concerning the type of a job having been processed upon occurrence of an error from an information processing device; the transmission destination determining step of determining a transmission destination of support information by accessing a storage device storing correspondence between the type of the job and the transmission destination of the support information, based on the information concerning the type of the job obtained in the obtaining step; and the transmitting step of transmitting the support information to the transmission destination determined in the determining step.

According to another aspect of the present invention, an error notification method includes: the step of detecting occurrence of an error in an information processing device; the step of detecting a job having been processed upon the occurrence of the error; and the transmitting step of transmitting information concerning the type of the job from the information processing device to another device.

According to yet another aspect of the present invention, an error notification program product causes a computer to execute: the obtaining step of obtaining information concerning the type of a job having been processed upon occurrence of an error from an information processing device; the transmission destination determining step of determining a transmission destination of support information by accessing a storage device storing correspondence between the type of the job and the transmission destination of the support information, based on the information concerning the type of the job obtained in the obtaining step; and the transmitting step of transmitting the support information to the transmission destination determined in the determining step.

According to yet another aspect of the present invention, an error notification program product causes a computer to execute: the step of detecting occurrence of an error in an information processing device; the step of detecting a job having been processed upon the occurrence of the error; and the transmitting step of transmitting information concerning the type of the job from the information processing device to another device.

According to yet another aspect of the present invention, an error notification device includes: an obtaining portion obtaining information concerning the type of a job having been processed upon occurrence of an error from an information processing device; a transmission destination determining portion determining a transmission destination of support information by accessing a storage device storing correspondence between the type of the job and the transmission destination of the support information, based on the information concerning the type of the job obtained by the obtaining portion; and a transmitting portion transmitting the support information to the transmission destination determined by the determining portion.

According to yet another aspect of the present invention, an error notification device includes: an error detecting portion detecting occurrence of an error; a job detecting portion detecting a job having been processed upon the occurrence of the error; and a transmitting portion transmitting information concerning the type of the job to another device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A-6C show specific examples of a knowledge base according to the first embodiment.

DESCRIPTION OF THE PREFERRED EMBODIMENTS

Hereinafter, embodiments of the present invention will be described with reference to the drawings. In the following description, the same portions and the same constituent elements have the same reference characters allotted, and have the same names and functions as well.

First Embodiment

Figure 1:
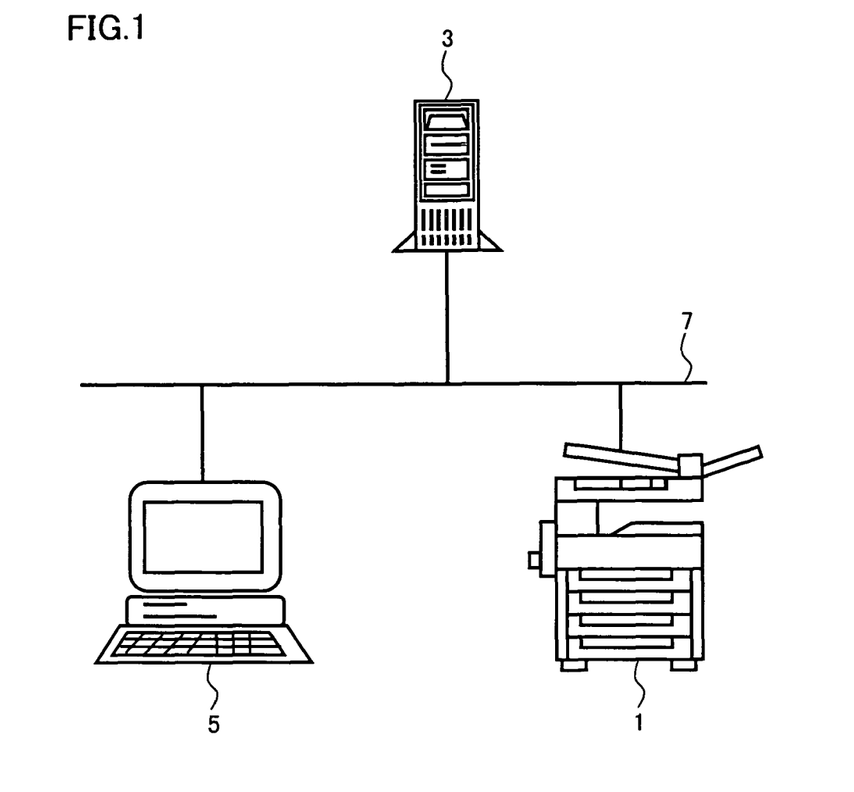
FIG. 1 shows a specific example of a configuration of an information processing system according to a first embodiment of the present invention.

Referring to FIG. 1, the information processing system according to a first embodiment of the present invention includes an image processor 1 identified as an example of an information processing device, a host 3 performing remote diagnosis of image processor 1, and a user terminal 5, which are connected via a wired or wireless network 7.

Figure 2:
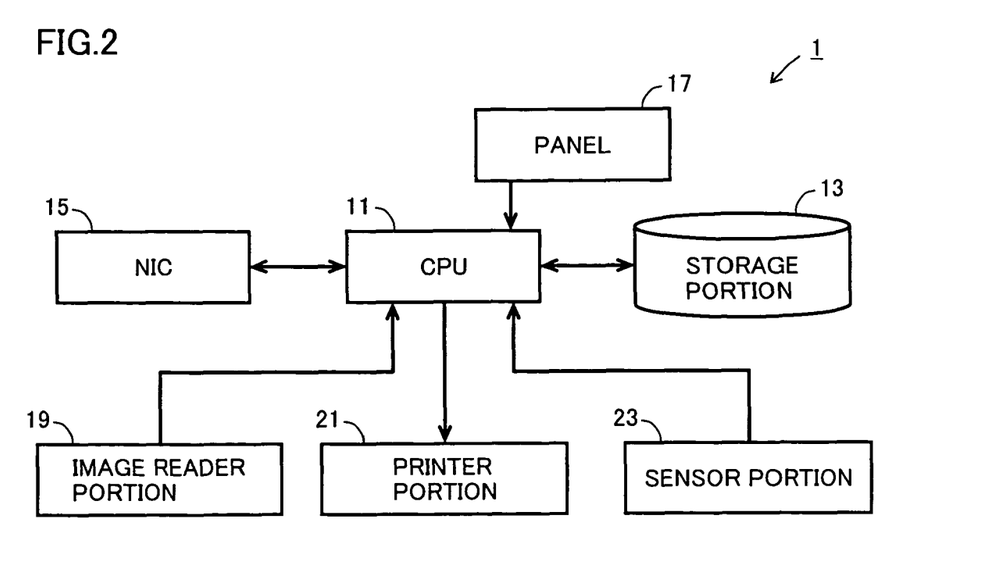
FIG. 2 is a block diagram showing a specific example of a hardware configuration of an image processor 1.

Image processor 1 may be a copier, a printer, or an MFP (Multi Function Peripheral) being the composite machine thereof. In the present embodiment, it is assumed that image processor 1 is the MFP. FIG. 2 shows in block diagram a specific example of the hardware configuration of image processor 1 that is the MFP.

Referring to FIG. 2, image processor 1 includes a CPU (Central Processing Unit) 11 controlling the entire device, an image reader portion 19 reading image data from an original, a printer portion 21 printing the image on a sheet of paper, a NIC (Network Interface Card) 15 that is an expansion card inserted into an expansion slot (not shown) for connecting image processor 1 to a network 7 or a telephone line, or for performing short-range radio communication, a storage portion 13 configured with a HD (Hard Disk) or the like and storing a job as well as a program executed by CPU 11, a panel 17 serving as an interface with a user, and a sensor portion 23 detecting the remaining amount of consumables or the like.

Figure 3:
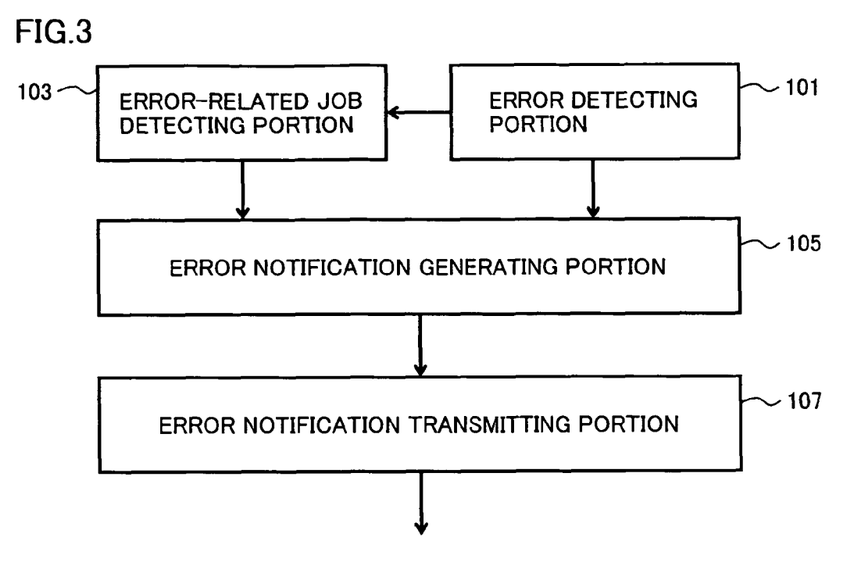
FIG. 3 is a block diagram showing a specific example of a functional configuration for performing error notification processing according to the first embodiment in image processor 1.

The functional configuration shown in FIG. 3 corresponds to the function that is formed in CPU 11 as it executes a program stored in storage portion 13.

Referring to FIG. 3, in image processor 1, the function for performing error notification processing is configured with an error detecting portion 101 detecting occurrence of an error, an error-related job detecting portion 103 detecting the job where the error has occurred, an error notification generating portion 105 generating information (hereinafter, referred to as "error information") for notifying host 3 of the error, and an error notification transmitting portion 107 notifying host 3 of the error.

Error detecting portion 101 detects the error such as paper jam, interruption of communication, full state of waste toner tank (not shown) or the like, based on a signal received by CPU 11 from each portion shown in FIG. 2. It then inputs the error detection information to error-related job detecting portion 103 and error notification generating portion 105.

Error-related job detecting portion 103 detects the job having been processed when the relevant error occurred, based on an error detection signal from error detecting portion 101, and inputs the information to error notification generating portion 105.

Error notification generating portion 105 generates the error information based on an error detection signal from error detecting portion 101 and the information input from error-related job detecting portion 103, and inputs the error information to error notification transmitting portion 107. The error information generated at least includes information concerning the type of the job having been processed when the error occurred, and preferably includes other information concerning the job, information concerning the error occurred, and information (device ID) specifying image processor 1.

The information concerning the error occurred may include the type of the error, the location of occurrence of the error on image processor 1 or the position of occurrence of the error on the program executed by image processor 1, and information concerning the timing of occurrence of the error.

The information concerning the type of the job may include copy, PC print (print of data transmitted from a user terminal), BOX print (print of data stored in a user-dedicated storage area called a BOX within image processor 1), and others. The other information concerning the job may include the name of the data to be processed, information specifying the job performer (i.e., login information or information specifying the person who has issued (or performs) the job, e.g., in the case of the copy job, login information (user information) authenticated prior to the copy job, and in the case of the print job, user information of the person who has issued (or performs) the print job), information concerning the timing of execution of the job such as job execution time, and others.

Error notification transmitting portion 107 transmits the input error information by NIC 15 via network 7 to host 3.

Figure 4:
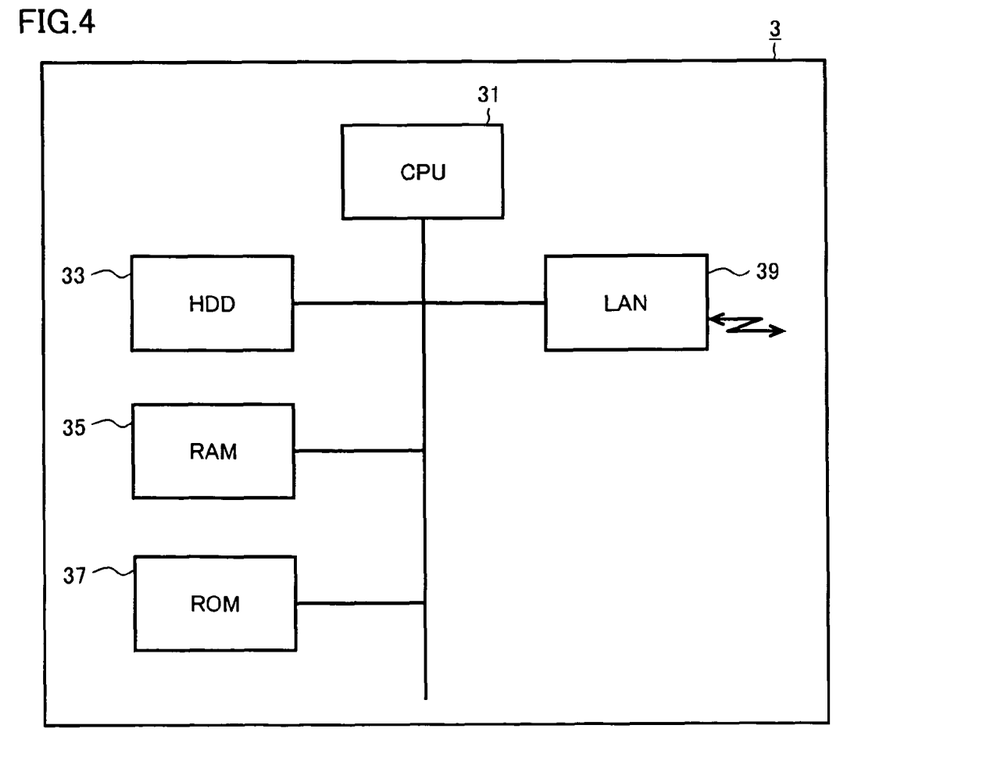
FIG. 4 is a block diagram showing a specific example of a hardware configuration of a host 3.

Host 3 corresponds to a typical computer or the like. FIG. 4 shows in block diagram a specific example of the hardware configuration of host 3 that is implemented by a typical computer or the like.

Referring to FIG. 4, host 3 includes a CPU 31 controlling the entire device, a LAN (Local Area Network) card 39 (or a modem card) for performing communication with another device via network 7, a HDD (Hard Disk Drive) 33, a RAM (Random Access Memory) 35, and a ROM (Read Only Memory) 37 storing a program executed by CPU 31 or the like.

Figure 5:
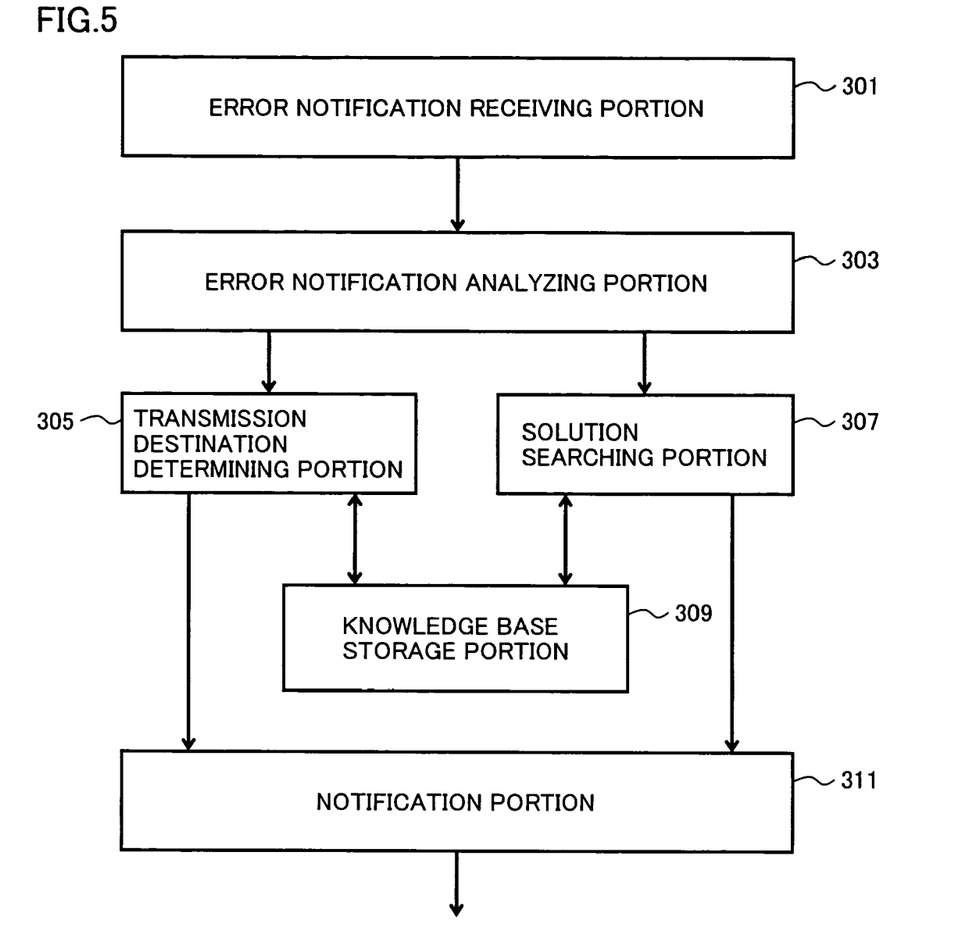
FIG. 5 is a block diagram showing a specific example of a functional configuration for performing the error notification processing of the first embodiment in host 3.

The functional configuration shown in FIG. 5 corresponds to the function that is formed primarily in CPU 31 when it executes the program stored in ROM 37 or the like.

Referring to FIG. 5, the function for performing the error notification processing in host 3 is configured with an error notification receiving portion 301 receiving the error notification, an error notification analyzing portion 303 analyzing the error notification, a transmission destination determining portion 305 determining a transmission destination to which the error notification is to be transmitted, a solution searching portion 307 searching a solution to the notified error, a knowledge base storage portion 309 storing a knowledge base of which specific examples are shown in FIGS. 6A-6C, and a notification portion 311 performing error notification by transmitting the information (hereinafter, referred to as "support information") indicating the solution to a prescribed transmission destination.

The knowledge base, as seen from the specific examples in FIGS. 6A-6C, is a database that stores correspondence between the type of the job having been processed when the error occurred and the transmission destination to which the support information is to be transmitted (FIG. 6A), and correspondence between the type of the error in the job and the content (solution) to be displayed on the device at the transmission destination (FIGS. 6B, 6C).

The knowledge base may be prestored in host 3. Alternatively, it may be generated and stored by a specific operator such as a manager of the information processing system. Still alternatively, it may be automatically constructed based on how the specific operator such as the manager addresses the error.

Knowledge base storage portion 309 is a prescribed storage area in hard disk drive 33 or RAM 35 that stores such a knowledge base.

Error notification receiving portion 301 receives the error information from image processor 1 and inputs the same to error notification analyzing portion 303. The input error information is analyzed at error notification analyzing portion 303, and the analysis result is input to transmission destination determining portion 305. The analysis result is also input from error notification analyzing portion 303 to solution searching portion 307, and a solution search request is issued.

Transmission destination determining portion 305 accesses knowledge base storage portion 309 to refer to the knowledge base based on the input analysis result, and determines the transmission destination of the support information corresponding to the type of the job.

More specifically, the transmission destination is specified to be the "device panel" or the "user terminal panel" according to the type of the job, as shown in FIG. 6A. In the case of the "device panel", the actual transmission destination is determined based on the information (device ID) specifying the image processor included in the error information transmitted. In the case of the "user terminal panel", it is determined based on the information specifying the job performer included in the transmitted error information. When the actual transmission destination is directly specified, as in the case where the information (device ID) specifying the image processor or the information specifying the job performer is an IP address, then the information transmitted may be utilized directly. Alternatively, the actual transmission destination may be specified by referring to the information stored in host 3 based on the transmitted information.

Solution searching portion 307 accesses knowledge base storage portion 309 to search the knowledge base in response to the request from error notification analyzing portion 303, and retrieves the solution corresponding to the type of the error in the job.

The determined transmission destination of the support information and the obtained solution are input to notification portion 311. In notification portion 311, the support information for displaying the solution is generated based on the input information, and is transmitted to the designated transmission destination by LAN 39 via network 7.

Figure 7:
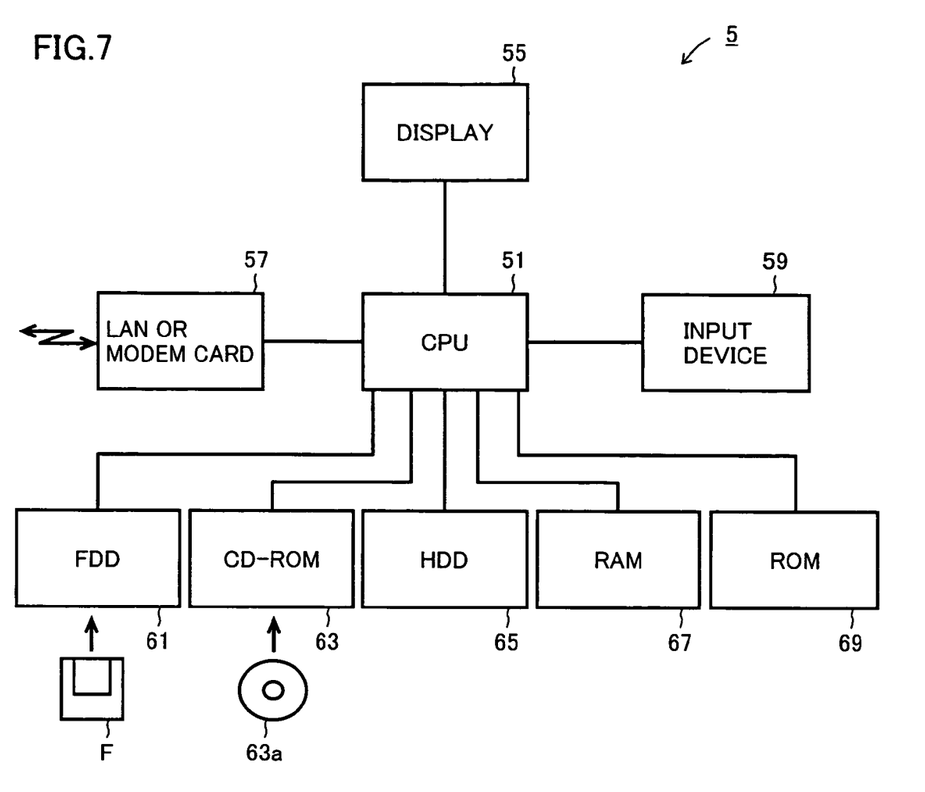
FIG. 7 is a block diagram showing a specific example of a hardware configuration of a user terminal 5.

User terminal 5 corresponds to a personal computer or the like. FIG. 7 shows in block diagram a specific example of the hardware configuration of user terminal 5 that is implemented by a typical personal computer or the like.

Referring to FIG. 7, user terminal 5 includes a CPU 51 controlling the entire device, a display 55, a LAN card 57 (or a modem card) for connection to network 7 or communication with the outside, an input device 59 configured with a keyboard, a mouse and the like, an FDD (Flexible Disk Drive) 61, a CD-ROM (Compact Disk-Read Only Memory) drive 63, a hard disk drive 65, a RAM 67, and a ROM 69.

Flexible disk drive 61 is capable of reading data such as a program recorded on a flexible disk F, and CD-ROM drive 63 is capable of reading data such as a program recorded on a CD-ROM 613a.

User terminal 5 has a functional configuration similar to that of a typical personal computer.

Figures 8A, 8B:
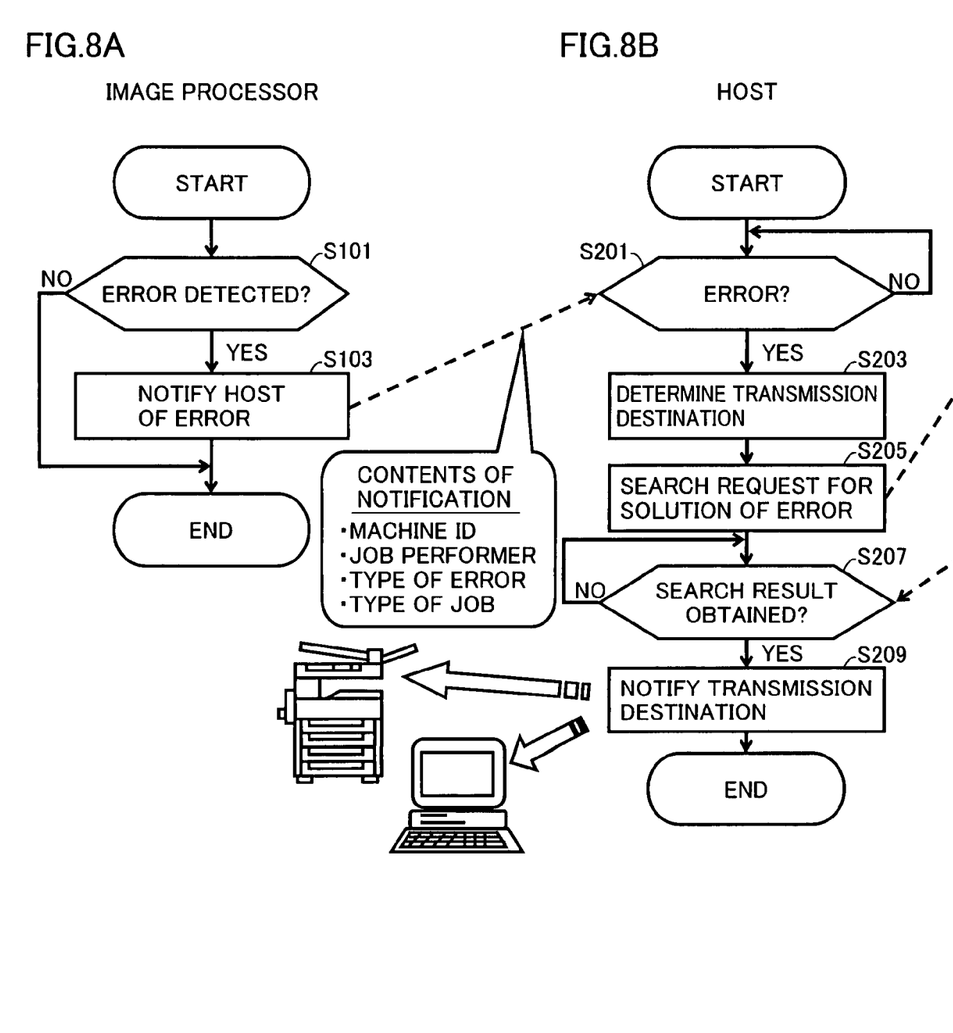
FIGS. 8A-8C are flowcharts illustrating the error notification processing according to the first embodiment.
Figure 8C:
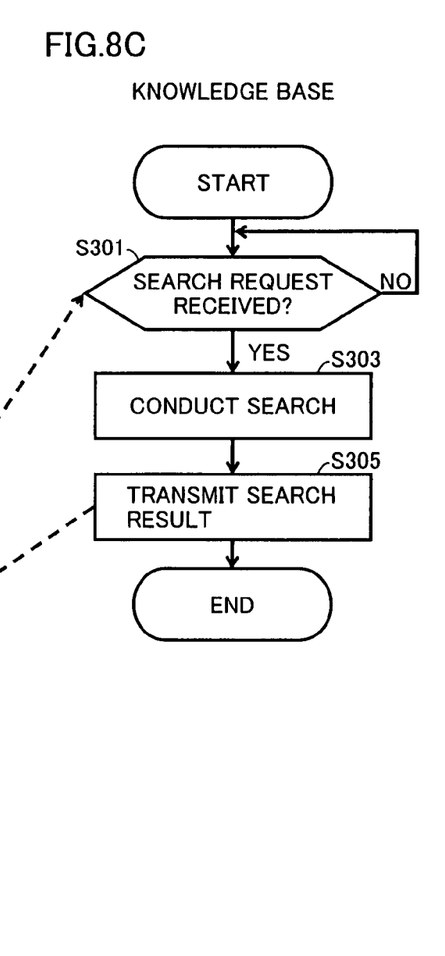

The processes shown by the three flowcharts in FIGS. 8A to 8C are each implemented when the programs stored in storage portion 13 and ROM 37 are read and executed by CPU 11 of image processor 1 and CPU 31 of host 3.

Referring to FIG. 8A, firstly, in image processor 1, when error detecting portion 101 detects occurrence of an error (YES in step S 101), the respective portions perform processing, and error notification transmitting portion 107 transmits the error information generated by error notification generating portion 105 to host 3, to notify host 3 of the error (step S103). The processing at image processor 1 is thus completed.

Next, referring to FIG. 8B, in host 3, when error notification receiving portion 301 receives the error information transmitted in step S 103 above (YES in step S201), transmission destination determining portion 305 determines the transmission destination of the support information (step S203). Further, error notification analyzing portion 303 requests solution searching portion 307 to search for the solution (step S205).

Referring to FIG. 8C, when solution searching portion 307 receives the request (YES in step S301), the knowledge base stored in knowledge base storage portion 309 is accessed to conduct the search (step S303). The solution corresponding to the type of the error in the job is obtained based on the type of the job and the type of the error obtained through the analysis at error notification analyzing portion 303. The solution obtained is transmitted from solution searching portion 307 to notification portion 311 as the search result (step S305).

Referring to FIG. 8B, when the search result is obtained in notification portion 311 (YES in step S207), the support information for causing the solution to be displayed is transmitted to the transmission destination determined in step S203, so that the error is notified (step S209).

The transmission destination may be image processor 1 or user terminal 5. When the support information is received at the device, a prescribed program is executed, and the solution is displayed on panel 17 or display 55. If a prescribed condition is satisfied, as in the case where displaying the solution interrupts the manipulation of another user, for example, other processing may be carried out, e.g., not to display the solution, to display it after a lapse of a prescribed time, or to transfer the support information to another device set in advance.

In the present embodiment, it is assumed that host 3 performing the remote diagnosis is included in the information processing system, and that the error notification processing where the support information is transmitted by host 3 is carried out. Alternatively, image processor 1 may perform self-diagnosis to execute the error notification processing, or the error notification processing may be carried out in user terminal 5. In such a case, the function shown in FIG. 5 is included in image processor 1 or in user terminal 5.

Since the information processing system of the present embodiment carries out the error notification processing as described above, when there occurs an error during execution of a job, it is possible to notify an appropriate notification destination of the error and transmit the support information thereto, taking into consideration whether the user who is supposed to address the error is near the image processor or near the user terminal. This enables quick and appropriate handling of the error.

Second Embodiment

Figure 9:
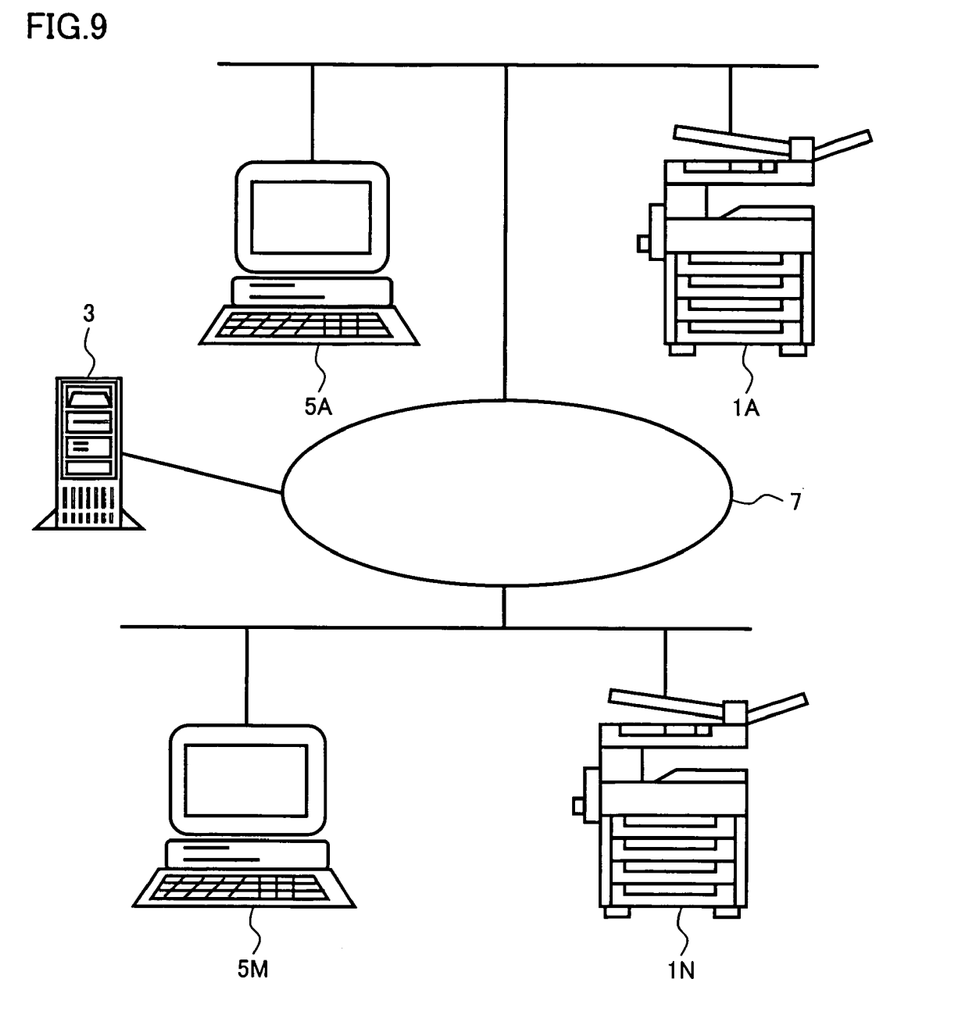
FIG. 9 shows a specific example of a configuration of an information processing system according to a second embodiment of the present invention.

Referring to FIG. 9, an information processing system according to a second embodiment of the present invention includes a plurality of image processors 1A-1N, a host 3 performing remote diagnosis of image processors 1A-1N, and a plurality of user terminals 5A-5M, which are connected via a wired or wireless network 7.

The hardware configuration and the functional configuration of image processors 1A-1N are similar to those of image processor 1 (FIGS. 2 and 3) in the first embodiment. Further, the hardware configuration of user terminals 5A-5M is similar to that of user terminal 5 (FIG. 7) of the first embodiment. The functional configuration of user terminals 5A-5M is similar to that of a typical personal computer.

In the information processing system according to the present embodiment, a job group, a so-called work flow, is to be processed. The work flow refers to the job group formed of a combination of a plurality of jobs, each job being executed at a prescribed timing (for a prescribed user, in a prescribed order). The information regarding the prescribed timing may be included, e.g., in a header portion of the work flow, or may be stored in a specific device such as a management device.

In the information processing system of the present embodiment, the work flow is to be processed. Thus, the information specifying the job having been processed when the error occurred, which is included in the error information generated by error notification generating portion 105 of image processors 1A-1N, not only includes the type of the job, the name of the data being processed, the information specifying the job performer (login information or the like) and the information concerning the timing of execution of the job, but also includes, as other job information, information specifying a starter of the work flow, information specifying a performer of the job immediately preceding the job having been processed when the error occurred, information specifying a performer of the job that is to be performed immediately after the job having been processed when the error occurred, and information (device ID) specifying the image processor where the error occurred. In the correspondence between the type of the job and the transmission destination of the support information shown in FIG. 10 as will be described later, if the image processor that executed or will execute the job proceeding or succeeding the job during which the error occurred is designated as the transmission destination, then the other job information further includes information (device ID) specifying the image processor having executed the job preceding the job during which the error occurred, information (device ID) specifying the image processor that is supposed to execute the job succeeding the job during which the error occurred, and others.

Figure 10:
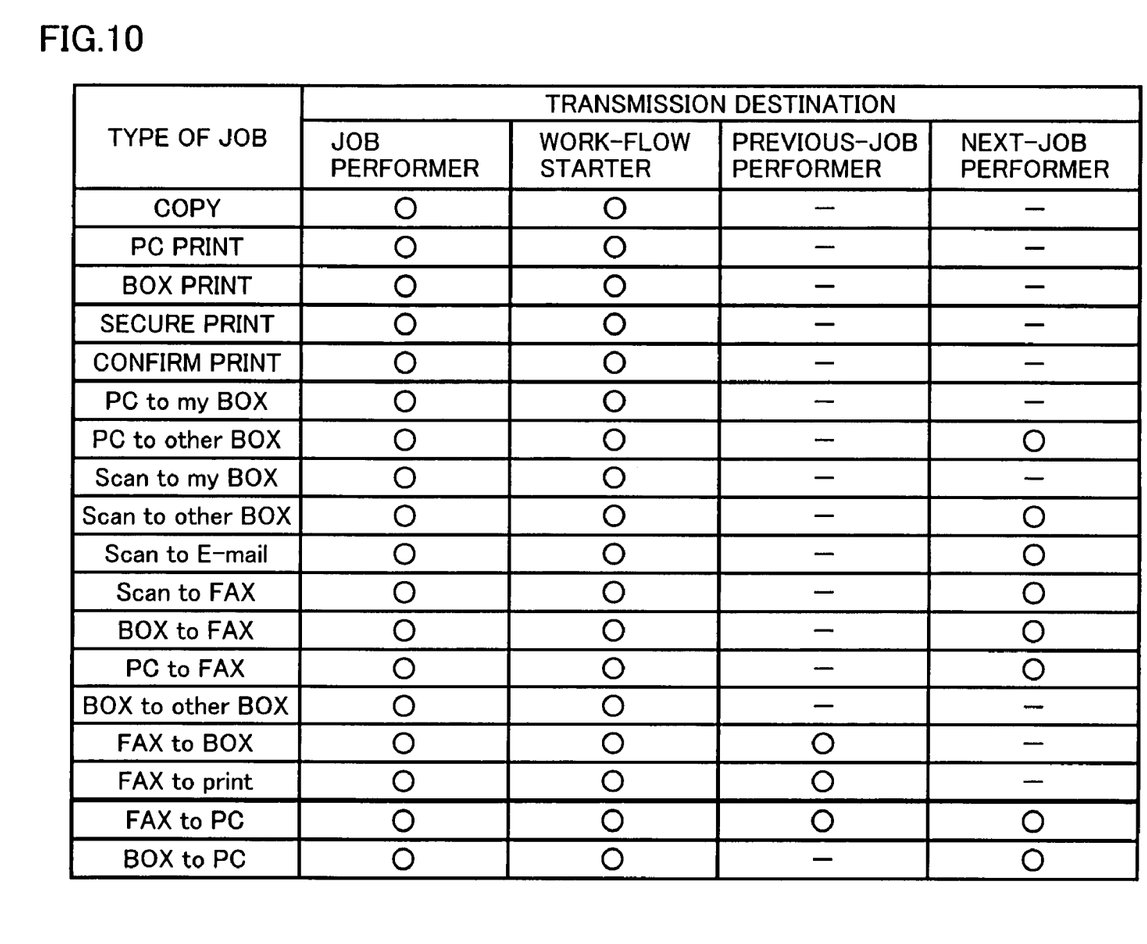
FIG. 10 shows correspondence between the types of jobs and the transmission destinations of support information in the knowledge base of the second embodiment.

In the knowledge base stored in knowledge base storage portion 309, the correspondence between the type of the job and the transmission destination of the support information is determined in accordance with the timing at which the relevant job is executed in the work flow, as seen from the specific example shown in FIG. 10.

Specifically, referring to FIG. 10, for each type of job, a transmission destination of the support information upon occurrence of an error while the relevant job is being processed is predetermined from among the user terminals of the performer of the job, the starter of the work flow including the job, the performer of the job immediately preceding the job, and the performer of the job to be performed next. Such correspondence may also be prestored in host 3, or may be prepared and stored by a specific operator such as a manager of the information processing system, or may be automatically constructed based on the way of addressing the error by the specific operator such as a manager.

The error notification processing according to the second embodiment is similar to the error notification processing of the first embodiment shown by the flowcharts of FIGS. 8A-8C. Hereinafter, the error notification processing when there occurs an error during execution of each job constituting the work flow will be described with reference to a specific example of the flow of processing of the work flow shown in FIG. 11.

Figure 11:
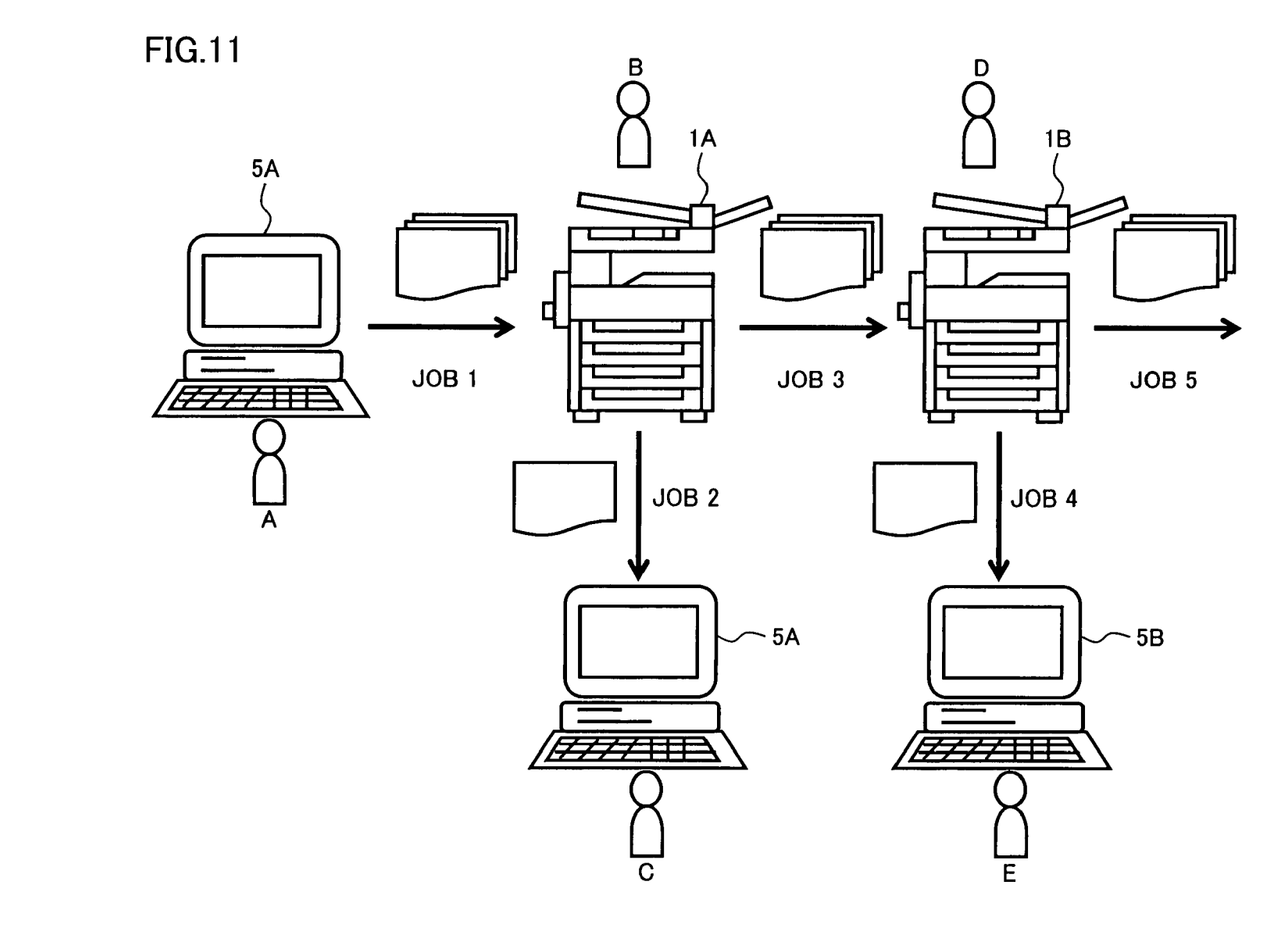
FIG. 11 shows a specific example of flow of processing of the work flow.

Referring to FIG. 11, it is assumed that a specific example of the work flow has the following jobs 1 to 5 combined together, which are executed in this order by users A, B and D.

Job 1 (PC to other BOX): User A transmits image data from user terminal 5A to BOX of user B of image processor 1A.

Job 2 (BOX to PC): User B transmits only the first piece of the image data from BOX of user B of image processor 1A to user terminal 5A.

Job 3 (BOX to other BOX): User B transmits the image data from BOX of user B of image processor 1A to BOX of user D of image processor 1B.

Job 4 (BOX to PC): User D transmits only the first piece of the image data from BOX of user D of image processor 1B to user terminal 5B.

Job 5 (BOX print): User D prints out the image data from BOX of user D of image processor 1B.

When an error occurs in image processor 1A during execution of job 1 (PC to other BOX), in host 3, in step S203, error notification analyzing portion 303 detects occurrence of the error during the execution of the work flow, based on the error information received from image processor 1A in step S201. Transmission destination determining portion 305 refers to the knowledge base shown in FIG. 10 and determines the transmission destinations of the support information to be user A (user terminal) who is the performer of job 1 and the starter of the processing of the work flow, and user B (user terminal) who is the performer of succeeding job 2.

Further, when an error occurs in image processor 1A during execution of job 2 (BOX to PC), in host 3, in step S203, error notification analyzing portion 303 detects occurrence of the error during the execution of the work flow, based on the error information received from image processor 1A in step S201. Transmission destination determining portion 305 refers to the knowledge base shown in FIG. 10 and determines the transmission destinations of the support information to be user B (user terminal) who is the performer of job 2 and of succeeding job 3, and user A (user terminal) who started the processing of the work flow.

When an error occurs in image processor 1A during execution of job 3(BOX to other BOX), in host 3, in step S203, error notification analyzing portion 303 detects occurrence of the error during the execution of the work flow, based on the error information received from image processor 1A in step S201. Transmission destination determining portion 305 refers to the knowledge base shown in FIG. 10 and determines the transmission destinations of the support information to be user B (user terminal) who is the performer of job 3 and of preceding job 2, and user A (user terminal) who started the processing of the work flow.

Further, when an error occurs in image processor 1B during execution of job 4 (BOX to PC), in host 3, in step S203, error notification analyzing portion 303 detects occurrence of the error during the execution of the work flow, based on the error information received from image processor 1B in step S201. Transmission destination determining portion 305 refers to the knowledge base shown in FIG. 10 and determines the transmission destinations of the support information to be user D (user terminal) who is the performer of job 4 and of succeeding job 5, and user A (user terminal) who started the processing of the work flow.

Furthermore, when an error occurs in image processor 1B during execution of job 5 (BOX print), in host 3, in step S203, error notification analyzing portion 303 detects occurrence of the error during the execution of the work flow, based on the error information received from image processor 1B in step S201. Transmission destination determining portion 305 refers to the knowledge base shown in FIG. 10 and determines the transmission destinations of the support information to be user D (user terminal) who is the performer of job 5, and user A (user terminal) who started the processing of the work flow. The actual transmission destination may be specified in the similar manner as in the first embodiment described above.

Thereafter, the processing similar to the error notification processing in the first embodiment is carried out, and the support information is transmitted to the transmission destination determined.

Since the error notification processing described above is carried out in the information processing system of the present embodiment, when an error occurs during execution of the job in the work flow, not only the performer of the relevant job, but also the starter of the work flow or other appropriate notification destination associated with the work flow can be notified of occurrence of the error, and the support information can be transmitted thereto. This enables quick and appropriate handling of the error.

Further, in the information processing system of the present embodiment, the error notification processing of the first embodiment and the error notification processing of the second embodiment may be carried out in combination. In such a case, knowledge base storage portion 309 of host 3 stores both the knowledge base that is used when there occurs an error during execution of a normal job as shown in FIGS. 6A-6C, and the knowledge base that is used when there occurs an error during execution of a job in the work flow as shown in FIG. 10. In step S203 described above, error notification analyzing portion 303 determines whether the error occurred during the execution of a normal job or during the execution of a job in the work flow, based on the error information received from image processor 1 in step S201, and uses the knowledge base corresponding to the determined result in the subsequent processing.

Furthermore, the error notification method executed by the above-described information processing system may be provided as a program. Such a program may be provided in the form of a program product by recording the same on a computer-readable recording medium, such as a flexible disk, CD-ROM, ROM, RAM or memory card, that is attached to the computer. Alternatively, the program can be provided by recording the same in a recording medium like a hard disk that is built in the computer. Further, the program may be provided by downloading the same via a network.

The program product provided is installed in a program storage portion in the hard disk or the like for execution. The program product includes the program itself and a recording medium having the program recorded therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An error notification method, comprising the steps of:
obtaining information identifying a type of a first job having been processed upon occurrence of an error from an information processing device;
determining a transmission destination of support information by accessing a storage device storing correspondence between the type of the job and the transmission destination of the support information, based on said information identifying the type of the first job obtained in said obtaining step; and
transmitting the support information to said transmission destination determined in said determining step.

2. The error notification method according to claim 1, wherein in said obtaining step, information concerning said error having occurred is further obtained from said information processing device,
said method further comprising the support information determining step of determining the support information corresponding to said information concerning said error by accessing a support information storage device storing correspondence between the type of the error and the support information, wherein
in said transmitting step, said support information determined in said support information determining step is transmitted to said transmission destination determined in said transmission destination determining step.

3. The error notification method according to claim 2, wherein
in said obtaining step, information concerning a performer of said first job and identification information of said information processing device are further obtained from said information processing device, and
in said transmission destination determining step, the transmission destination is determined based on said information concerning the type of said first job, said information concerning the performer of said first job, and said identification information of said information processing device.

4. The error notification method according to claim 1, wherein
said first job belongs to a job group that includes said first job and a second job, said first job and said second job being executed at prescribed timings, in said obtaining step, information concerning said second job is further obtained from said information processing device, and in said transmission destination determining step, the transmission destination is determined based on said information concerning the type of said first job and said information concerning said second job.

5. The error notification method according to claim 4, wherein said information concerning said second job includes information concerning a performer of said second job.

6. The error notification method according to claim 1, comprising the further steps of:
   detecting occurrence of an error in the information processing device;
   detecting the first job having been processed upon the occurrence of said error; and
   transmitting said information identifying the type of said first job from said information processing device to another device.

7. The error notification method according to claim 6, wherein in said transmitting step, information concerning said error is further transmitted.

8. The error notification method according to claim 7, wherein in said transmitting step, information concerning a performer of said first job and identification information of said information processing device are further transmitted.

9. The error notification method according to claim 6, wherein
   said first job belongs to a job group that includes said first job and a second job, said first job and said second job being executed at prescribed timings, and
   in said transmitting step, information concerning said second job is further transmitted.

10. The error notification method according to claim 9, wherein said information concerning said second job includes information concerning a performer of said second job.

11. An error notification program product embodied on a tangible computer readable storage medium causing a computer to execute processing of an error notification in an information processing device comprising the steps of:
   obtaining information identifying a type of a first job having been processed upon occurrence of an error from said information processing device;
   determining a transmission destination of support information by accessing a storage device storing correspondence between the type of the job and the transmission destination of the support information, based on said information identifying the type of said first job obtained in said obtaining step; and
   transmitting the support information to the transmission destination determined in said determining step.

12. The error notification program product according to claim 11, wherein in said obtaining step, information concerning said error having occurred is further obtained from said information processing device,
   said processing further comprising determining the support information corresponding to the information concerning said error by accessing a support information storage device storing correspondence between the type of the error and the support information, wherein
   in said transmitting step, said support information determined in said support information determining step is transmitted to said transmission destination determined in said transmission destination determining step.

13. The error notification program product according to claim 12, wherein in said obtaining step, information concerning a performer of said first job and identification information of said information processing device are further obtained from said information processing device, and in said transmission destination determining step, the transmission destination is determined based on said information concerning the type of said first job, said information concerning the performer of said first job, and said identification information of said information processing device.

14. The error notification program product according to claim 11, wherein
   said first job belongs to a job group that includes said first job and a second job, said first job and said second job being executed at prescribed timings,
   in said obtaining step, information concerning said second job is further obtained from said information processing device, and
   in said transmission destination determining step, the transmission destination is determined based on said information concerning the type of said first job and said information concerning said second job.

15. The error notification program product according to claim 14, wherein said information concerning said second job includes information concerning a performer of said second job.

16. An error notification device, comprising:
   an obtaining portion obtaining information identifying a type of a first job having been processed upon occurrence of an error from an information processing device;
   a transmission destination determining portion determining a transmission destination of support information by accessing a storage device storing correspondence between the type of the job and the transmission destination of the support information, based on said information identifying the type of said first job obtained by said obtaining portion; and
   a transmitting portion transmitting the support information to the transmission destination determined by said determining portion.

17. The error notification device according to claim 16, wherein said obtaining portion further obtains information concerning said error having occurred from said information processing device,
   said error notification device further comprising a support information determining portion determining the support information corresponding to the information concerning said error by accessing a support information storage device storing correspondence between the type of the error and the support information, and
   wherein said transmitting portion further transmits said support information determined by said support information determining portion to said transmission destination determined by said transmission destination determining portion.

18. The error notification device according to claim 17, wherein
   said obtaining portion further obtains information concerning a performer of said first job and identification information of said information processing device from said information processing device, and
   said transmission destination determining portion determines the transmission destination based on said information concerning the type of said first job, said information concerning the performer of said first job, and said identification information of said information processing device.

19. The error notification device according to claim 16, wherein said first job belongs to a job group that includes said first job and a second job, said first job and said second job being executed at prescribed timings, said obtaining portion further obtains information concerning said second job from said information processing device, and said transmission destination determining portion determines the transmission destination based on said information concerning the type of said first job and said information concerning said second job.

20. The error notification device according to claim 19, wherein said information concerning said second job includes information concerning a performer of said second job.

\* \* \* \* \*